Dec. 12, 1933.          C. C. FUERST          1,939,210
ROLL HOLDING CAMERA
Filed Nov. 17, 1932
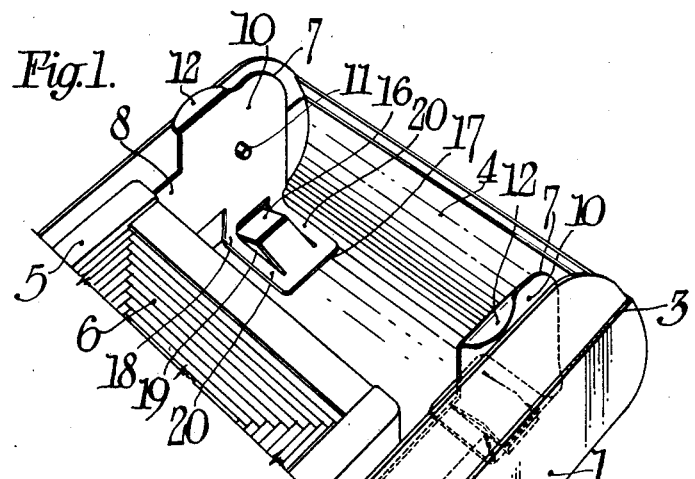
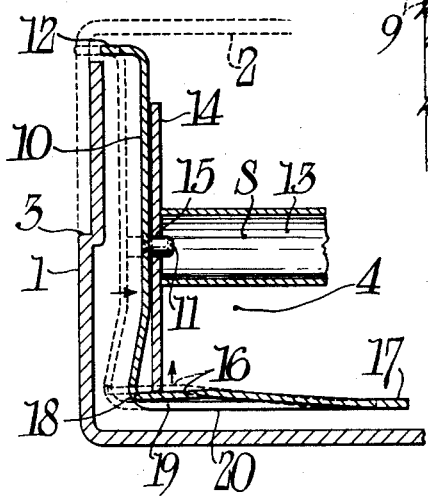
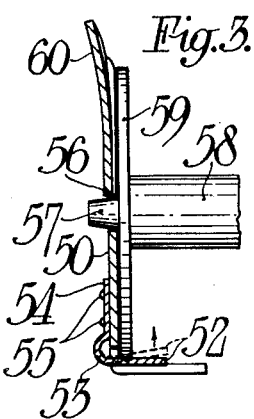
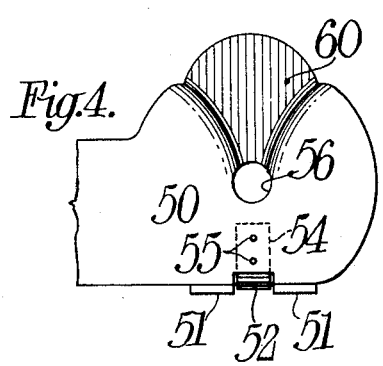
Inventor:
Carl C. Fuerst,
By Newton M. Perriss.
Donald H. Stewart, Attorneys Patented Dec. 12, 1933

1,939,210

UNITED STATES PATENT OFFICE 1,939,210

ROLL HOLDING CAMERA

Carl C. Fuerst, Rochester, N. Y., assignor to Eastman Kodak Company, Rochester, N. Y., a corporation of New York Application November 17, 1932
Serial No. 642,988

7 Claims. (Cl. 242—71)

This invention relates to photography and more particularly to roll film cameras. One object of my invention is to provide an improved spool holding mechanism for cameras. Another object of my invention is to provide a tensioning means for a film spool which will at all times exert an even tension on a spool held in the roll holder. Another object of my invention is to provide a spool support which consists of a resilient plate movable in a direction axially of the spool chamber, said resilient arm having a tensioning means struck from the spring metal moving at right angles to the axis of the spool chamber. Another object of my invention is to provide a film spool supporting structure into which a spool can be readily loaded and so arranged that regardless of the position of the spool holding arms an even tension is placed upon the flange of a spool supported by the roll holding structure. Still another object of my invention is to provide a film support which limits the downward movement of a film spool relative to the support so as to locate the spool with respect to the spool centering means and to prevent distorting the spool tensioning spring, and other objects will appear from the following specification, the novel features being particularly pointed out in the claims at the end thereof.

Coming now to the drawing wherein like reference characters denote like parts throughout;

Fig. 1 is a perspective view of the end of a camera equipped with spool supporting arms in accordance with and embodying a preferred form of my invention;

Fig. 2 is an enlarged fragmentary sectional view through a spool and one of the spool supports;

Fig. 3 is a view similar to Fig. 2 but with the film support constructed in accordance with a second embodiment of my invention;

Fig. 4 is a side elevation of the spool support shown in Fig. 3.

My present invention is particularly directed to an improvement over the spool supporting structure shown in U. S. Patent No. 1,504,977, Robertson and Kroedel, issued August 12, 1924.

With the new type of film spool which uses an extremely small core as compared with the film spools previously used in the same size cameras there has been considerable difficulty in creating an even tension of sufficient magnitude to hold the film spool sufficiently to draw the film taut across the exposure frame without making it difficult to wind the film by means of the usual type winding key. The new type of film spool being completely made of metal and having metal trunnions which cooperate with metal spool centering and supporting means turns much more freely than the old type of spool in which the trunnions were usually of wood and very often of comparatively rough wood.

In order to completely overcome these difficulties and to provide a very even tension on the film spool, I have devised the structure which will be fully described hereinafter.

As a preferred embodiment of my invention reference may be had to the accompanying drawing wherein 1 designates broadly a camera body having a cover portion 2 which may be separable from the camera along a center line 3. The camera body 1 has the usual spool chambers 4 at each end, only one of which is shown in the drawing and is provided with the usual exposure frame 5 which surrounds the rear end of the bellows 6.

The spool supports 7 are each preferably made of a relatively long strip of spring metal 8 which may be attached to the camera body 1 in any desired manner as by rivets 9. The shape of these spool supports is such that at least a portion 10 of them extends into the spool chamber 4.

These ends 10 are sufficiently resilient to permit a spool to be inserted between the spool centering means here shown as pins 11. The upper portion of the spool supports 10 are preferably flared outwardly at 12 to enable an operator to more easily enter the spool S so that the core 13 may be moved downwardly into the spool chamber 4 with the flanges 14 lying against parts 10 of the spool supports and the centering means 11 cooperating with the apertures 15 in the film spool.

When in an operative position a portion of the spool flange 14 contacts with a spring arm 16 formed in a lug 17 bent at 18 at substantially right angles to the support 10. The spring portion 16 can conveniently be made by providing at 19 a U-shaped cut-out which permits the spring finger to be formed up as shown. This spring finger is adapted to flex and to exert an upward pressure on the film spool flange as best shown in Fig. 2. The spool centering arm 10 as shown by the arrow in Fig. 2 can flex between the broken line position and the full line position shown in this figure. Thus the spring finger 16 which is preferably formed of the spring metal of which the spool support 10 is made exerts a pressure at substantially right angles to the movement of the support 10 which is axially of the spool chamber.

There are several advantages in providing this type of spring. First, it is useful to have the tension applied to the flange 14 of the film spool because the diameter of the convolutions of film and paper wound on the spool do not affect the tension applied to the spool. It is useful to have the spring tension in a fixed position relative to the film supporting device because the tension is applied to the spool regardless of its position axially of the spool chamber or regardless of whether or not the outer convolutions of paper and film on the spool are of a fixed diameter.

There is also an advantage in having the spring finger 16 so arranged that it cannot be pressed beyond a definite position which in Fig. 2 is defined by the sides 20 of the lug which have been bent at 18 from the spring support. Thus if the film spool flange 14 should be pressed down so that it would strike the arms 20 the spring 16 could not be flexed beyond its elastic limit because these arms would form a stop since they lie close to the bend 18. This is a useful feature because it frequently happens that a leaf spring placed in the film spool chamber is distorted beyond its elastic limit and then fails to exert an even pressure upon the film spool.

It is quite obvious that my improved spool centering and tensioning support can be made for any types of cameras and that the cooperating spool engaging parts may be of different shapes. For instance, in Fig. 3 the spool tensioning arm 50 is provided with a pair of overturned spool stops 51 which as best shown in Fig. 4 are spaced apart so that the end 52 of a leaf spring bent at 53 to form a springy connection with the support 50 can project between the two arms. After being bent at 53 the spring arm is provided with a flat section 54 which is attached to the spool support 50 in any desirable manner as by rivets 55.

In this case the spool centering mechanism may consist of an aperture 56 to support a spool trunnion 57 formed on a film spool core 58. The spool includes flanges 59. The trunnion 57 may be directed to the aperture 56 by means of a curved guide-way 60.

With this spool support just as with the first described film support when a spool is placed in the support the flange 59 engages the spring arm 52 to exert a constant tension on the flange. The lugs 51 form stops preventing the film spool from being moved downwardly too great a distance to enter the trunnion 57 into the supporting aperture 56.

It should be noted with the both described film supports that an even tension is always exerted upon the film spool flange by means of the tensioning spring. Since the tensioning spring moves with the spool supporting member the spool is preferably tensioned regardless of the position of the spool centering device. The spool centering device may both move axially of the film spool chamber while the tensioning device moves at right angles to the movement of the supporting arms. This structure has been found to be extremely durable because the springs cannot be accidentally bent beyond their elastic limit and because their position of contact on the film spool flange is always the same.

While I have illustrated in the accompanying drawing preferred forms of my invention it is obvious that other modifications can be made without departing from my invention. I contemplate as within the scope all such forms as may come within the terms of the appended claims.

What I claim as my invention and desire to be secured by Letters Patent in the United States is:

1. In a film supporting device for cameras, the combination with a camera body having spool chambers, of a spool support for said spool chamber including a spring arm attached to said camera body, said spring arm including a spring tensioning lug formed at an angle to the spring arm, a spool engaging device carried by the spring arm in a predetermined relation to the spring tensioning lug whereby a spool positioned on the spool engaging device may be also engaged by the spring tensioning lug and a constant tension may be applied to said spool.

2. In a film supporting device for cameras, the combination with a camera body having spool chambers, of a spool support for said spool chamber including a spring arm attached to said camera body, said spring arm including a member formed at an angle to the said arm, a spring lug bent from said member, a spool engaging device carried by said spring arm in fixed relation to the formed member and spring lug whereby a spool positioned in said spool engaging device may contact with said spring lug and an even tension may be applied to said spool irrespective of the position of said spool supporting spring arm.

3. In a film supporting device for cameras, the combination with a camera body having spool chambers, of a spool support for said spool chamber including a spring arm attached to said camera body, said spring arm including a member formed at an angle to the said arm, a lug formed of said member and supported along one edge by said member, said lug being bent from said member to form a spool flange engaging spring, a spool engaging device carried by said spring arm in fixed relation to said spring whereby an even tension may be applied to a film spool when a spool is supported by said spring arm.

4. In a film supporting device for cameras, the combination with a camera having spool chambers, of a spool support carried by the camera at least a part of which lies in the spool chamber, said spool support comprising a spring arm rigidly attached to the camera and adapted to spring in a direction longitudinal of the spool chamber, a portion of said spool support being bent at an angle to the main portion thereof and being positioned transversely with respect to the spool chamber, said bent portion forming a spring adapted to move at substantially right angles to the supporting arm.

5. In a film supporting device for cameras, the combination with a camera having spool chambers, of a spool support carried by the camera at least a part of which lies in the spool chamber, said spool support comprising a spring arm rigidly attached to the camera and adapted to spring in a direction longitudinal of the spool chamber, said spool support including an end bent at substantially right angles to the spring arm so as to constitute a spring adapted to move transversely of said spool chamber, whereby spring pressure may be applied to a spool in two directions.

6. In a film supporting device for cameras, the combination with a camera having spool chambers, of a spool support having one portion permanently attached to the camera, and another portion projecting into a chamber said portion having a sharp bend therein, one part of the arm projecting into the spool chamber being adapted to spring longitudinally of the chamber and said bent part being adapted to spring transversely thereof, whereby spring pressure is applied to a spool held in the spool support in two directions.

7. In a film supporting device for cameras, the combination with a camera body having spool chambers, of a spool support for said spool chambers including a spring arm attached to said camera body, a spool engaging a trunnion carried by said spring arm, and a spool tensioning spring carried by said arm said spring being located in a substantially parallel position to said spool trunnion and being carried by said arm, whereby a spool positioned on said trunnion is likewise engaged with said spring and said spring pressure upon said spool is constant in all positions of said spool support.

CARL C. FUERST.